(12) United States Patent
Herman et al.

(10) Patent No.: US 12,323,269 B2
(45) Date of Patent: Jun. 3, 2025

(54) VEHICLE DATA PROTECTION

(71) Applicant: Ford Global Technologies, LLC, Dearborn, MI (US)

(72) Inventors: David Michael Herman, West Bloomfield, MI (US); Yashanshu Jain, Dearborn, MI (US); Manvi Kamboj, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 494 days.

(21) Appl. No.: 17/749,414

(22) Filed: May 20, 2022

(65) Prior Publication Data

US 2023/0379188 A1 Nov. 23, 2023

(51) Int. Cl.
*H04L 12/40* (2006.01)
*B60R 16/023* (2006.01)
*H04W 4/40* (2018.01)

(52) U.S. Cl.
CPC ...... *H04L 12/40104* (2013.01); *B60R 16/023* (2013.01); *H04W 4/40* (2018.02); *H04L 2012/40215* (2013.01); *H04L 2012/40273* (2013.01)

(58) Field of Classification Search
CPC ..... H04L 12/40104; H04L 2012/42015; H04L 2012/40273; H04W 4/40; B60R 16/023
See application file for complete search history.

(56) References Cited

U.S. PATENT DOCUMENTS

| | | | |
|---|---|---|---|
| 6,519,350 B1 | 2/2003 | Van Overveld et al. | |
| 7,409,556 B2 | 8/2008 | Wu et al. | |
| 7,421,586 B2 | 9/2008 | Luo et al. | |
| 8,379,911 B2 | 2/2013 | Vashistha et al. | |
| 10,255,414 B2 | 4/2019 | Horning et al. | |
| 10,916,073 B2* | 2/2021 | Tonshal | G07C 5/0808 |
| 10,991,180 B2* | 4/2021 | Grenier | G07C 5/0825 |
| 11,004,169 B2 | 5/2021 | Nemes et al. | |

(Continued)

FOREIGN PATENT DOCUMENTS

| | | |
|---|---|---|
| CN | 109064381 A | 12/2018 |
| KR | 20010075944 A | 8/2001 |
| KR | 101234347 B1 | 2/2013 |

OTHER PUBLICATIONS

Boenisch et al., "A Survey on Model Watermarking Neural Networks", arXiv:2009.12153v1 [cs.CR] Sep. 25, 2020.

(Continued)

*Primary Examiner* — Chandrahas B Patel
(74) *Attorney, Agent, or Firm* — Christopher Storms; Brooks Kushman P.C.

(57) ABSTRACT

A method and apparatus for protecting vehicle data from a vehicle includes identifying the vehicle data to be included in output from a processor that is designated for protection, selecting a digital watermark based on a manner in which the output is subject to at least one of observation or interception, applying the digital watermark to the vehicle data to obtain watermarked output for output from the processor, and communicating a watermark identifier over a communication link of the vehicle to a location external from the vehicle. Detection of the digital watermark in data outside of the vehicle based upon the watermark identifier may be used to determine misuse of the vehicle data.

20 Claims, 4 Drawing Sheets

(56) References Cited

U.S. PATENT DOCUMENTS

| | | |
|---|---|---|
| 11,127,104 B1 | 9/2021 | Diedrich et al. |
| 11,592,828 B2 * | 2/2023 | Bramley ................... G06N 3/08 |
| 11,710,354 B1 * | 7/2023 | Schafer ................... H04L 67/12 |
| | | 701/32.6 |
| 2004/0071311 A1 | 4/2004 | Choi et al. |
| 2004/0136528 A1 | 7/2004 | Muratani |
| 2005/0169496 A1 | 8/2005 | Perry |
| 2007/0067079 A1 | 3/2007 | Kosugi |
| 2009/0141931 A1 | 6/2009 | Yadid-Pecht et al. |
| 2009/0310817 A1 | 12/2009 | Park et al. |
| 2011/0214188 A1 | 9/2011 | Collberg et al. |
| 2014/0016817 A1 | 1/2014 | Nakagata et al. |
| 2016/0021435 A1 | 1/2016 | Topchy et al. |
| 2016/0323741 A1 | 11/2016 | Lee et al. |
| 2018/0267558 A1 | 9/2018 | Tiwari et al. |
| 2018/0285537 A1 | 10/2018 | Wachtfogel et al. |
| 2019/0236745 A1 | 8/2019 | Kulkarni et al. |
| 2020/0050894 A1 | 2/2020 | Park |
| 2020/0284883 A1 | 9/2020 | Ferreira et al. |
| 2022/0266849 A1 * | 8/2022 | Vis ............................ G06F 8/20 |
| 2023/0324543 A1 * | 10/2023 | Kulkarni ................ G01S 13/52 |
| | | 342/191 |

OTHER PUBLICATIONS

Li et al., "A survey of deep neural network watermarking techniques", arXiv:2103.09274v1 [cs.CR] Mar. 16, 2021.

Monden et al., "A Practical Method for Watermarking Java Programs", The 24th Computer Software and Applications Conference (compsac2000), Taipei, Taiwan, Oct. 2000.

Uchida et al., "Embedding Watermarks into Deep Neural Networks", arXiv:1701.04082v2 [cs.CV] Apr. 20, 2017.

Yadollahi et al., "Robust Black-box Watermarking for Deep Neural Network using Inverse Document Frequency", arXiv:2103.05590v1 [cs.CR] Mar. 9, 2021.

"Zillow Claims Trade Secrets Protection Over Machine Learning Algorithms; Sues Compass For Theft", May 18, 2019, North Texas Legal News.

* cited by examiner

VEHICLE DATA PROTECTION

BACKGROUND

In recent years, vehicles have been using an increasing number of processors, and an increasing amount of vehicle data has been traversing vehicle networks such as the data bus (e.g., CAN bus) of vehicles, displayed on vehicle screens, and shared with other vehicles and infrastructure.

DETAILED DESCRIPTION

Figure 1:
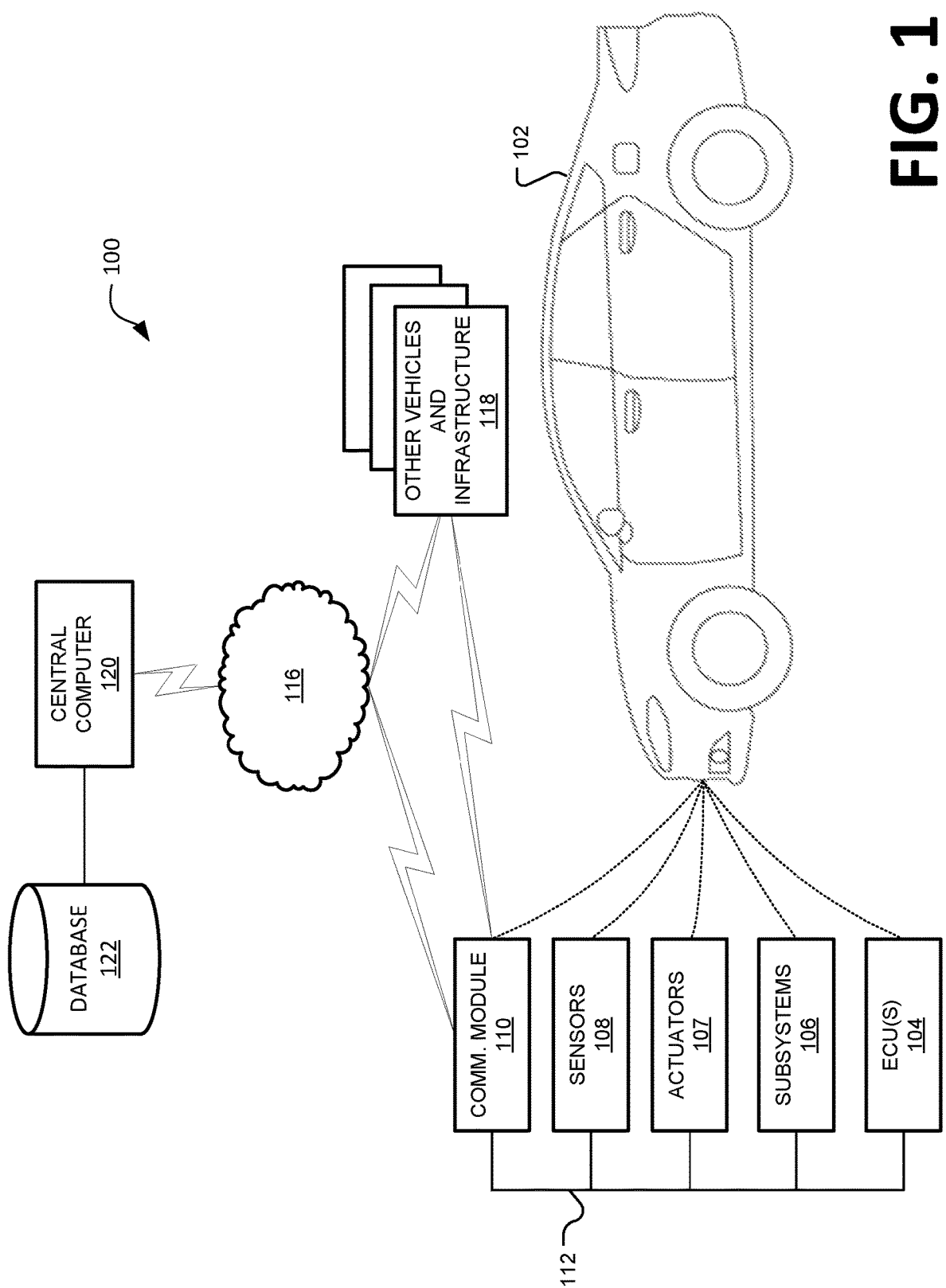
FIG. 1 is a diagram of an example system for protecting vehicle data.

Vehicle data that traverses a vehicle communication network such as a vehicle data bus can be displayed on vehicle screens or can be shared with other vehicles and infrastructure may be subject to misuse if it is intercepted or observed. For example, intercepted or observed vehicle data may be used to train a neural network to reverse engineer a proprietary vehicle algorithm. The present disclosure identifies vehicle data that should be protected from misuse, selects a digital watermark suitable to how it is observed and/or intercepted, and applies the digital watermark to the vehicle data to obtain watermarked output from a processor. In order to detect misuse of the watermarked output, a watermark identifier is saved to the cloud by being sent over a communication link of the vehicle. The watermark identifier, such as a secret key K, can later be used to identify misused vehicle data, even after it has been transformed.

In an implementation, a computing device for a vehicle includes a processor and a memory, the memory storing instructions executable by the processor, the instructions including instructions to: identify vehicle data to be included in output from the processor that is designated for protection; select a digital watermark based on a manner in which the output is subject to at least one of observation or interception; apply the digital watermark to the vehicle data to obtain watermarked output for output from the processor; and communicate a watermark identifier over a communication link of the vehicle to a location external from the vehicle.

In an example, the vehicle data may be output from an electronic control unit (ECU) in the vehicle.

In another example, the vehicle data is output from at least one of an automated driver assistance system (ADAS) algorithm or an autonomous vehicle (AV) algorithm.

The vehicle data may also be selected from at least one of meta data representation, compression output from perception, perception prediction output, sensor fusion output, localization data, planning data, path prediction data, motion planning data, or vehicle safety feature activation data.

In another example, the vehicle data may be at least one of data for actuation of a vehicle system or data for display on a human-machine interface (HMI).

The digital watermarked may be applied to the vehicle data in a secure channel for output as the watermarked output over an unsecure channel.

In an example, the unsecure channel may be a vehicle network selected from an Ethernet network and a controller area network (CAN) bus.

In another example, the unsecure channel may include a human-machine interface (HMI).

In a further example, the unsecure channel may include a cellular vehicle to vehicle (CV2V) transmission and/or a cellular vehicle to infrastructure (CV2X) transmission.

In another implementation, method for protecting vehicle data from a vehicle, includes: identifying the vehicle data to be included in output from a processor that is designated for protection; selecting a digital watermark based on a manner in which the output is subject to at least one of observation or interception; applying the digital watermark to the vehicle data to obtain watermarked output for output from the processor; and communicating a watermark identifier over a communication link of the vehicle to a location external from the vehicle.

In one example, the vehicle data may be output from an electronic control unit (ECU) in the vehicle.

In another example, the vehicle data may be output from at least one of an automated driver assistance system (ADAS) algorithm or an autonomous vehicle (AV) algorithm.

In a further example, the vehicle data may be selected from at least one of meta data representation, compression output from perception, perception prediction output, sensor fusion output, localization data, planning data, path prediction data, motion planning data, or vehicle safety feature activation data.

In an example, the vehicle data may be at least one of data for actuation of a vehicle system or data for display on a human-machine interface (HMI).

In another example, the digital watermark may be applied to the vehicle data in a secure channel for output as the watermarked output over an unsecure channel.

The unsecure channel May be a vehicle network selected from an Ethernet network and a controller area network (CAN) bus.

In another example, the unsecure channel may include a human-machine interface (HMI).

In a further example, the unsecure channel may include a cellular vehicle to vehicle (CV2V) transmission and/or a cellular vehicle to infrastructure (CV2X) transmission.

The method may further include de-serializing the watermarked output upon being received in a second secure channel for vehicle compute and actuation based upon the vehicle data.

The method may also include detecting the digital watermark in data outside of the vehicle based upon the watermark identifier to determine misuse of the vehicle data.

With reference to FIG. 1, a connected vehicle system 100 can provide communications between a vehicle 102, one or more other connected vehicles and infrastructure 118, and a central computer 120 to share data among the various entities.

Vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including but not limited to a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers in the form of electronic control units (ECUs) 104, ECUs/computers in other vehicles and infrastructure 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more ECUs 104 can be included in a vehicle 102 that may be any suitable type of ground vehicle 102, e.g., a passenger or commercial automobile such as a sedan, a coupe, a truck, a sport utility, a crossover, a van, a minivan, etc. An ECU 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations, such as by sending vehicle data over the vehicle network 112. Additionally, an ECU 104 or other computer may be programmed to determine whether and when a human operator is to control such operations. In accordance with the present disclosure, certain types of vehicle data, for example, unencrypted data from an ECU that may be used to reverse engineer proprietary programming or train a machine learning system, may be designated for protection.

An ECU 104 may include or be communicatively coupled to, e.g., via a vehicle network 112, such as a communications bus as described further below, more than one processor, e.g., included in components such as actuators 107, sensors 108, electronic controller units (ECUs) or the like included in the vehicle 102 for monitoring and/or controlling various vehicle components, e.g., a powertrain controller, a brake controller, a steering controller, etc. The ECUs 104 are generally arranged for communications on a vehicle communication network 112 that can include a bus in the vehicle 102, such as Ethernet (IEEE 802.3), a controller area network (CAN) or the like, and/or other wired and/or wireless mechanisms.

Various controllers and/or actuators 107 may receive data from one or more sensors 108 or ECUs 104 via the vehicle network 112. Vehicles 102 typically include a variety of actuators 107 and sensors 108 to detect internal states of actuated devices of the vehicle 102, for example, wheel speed, wheel orientation, and engine and transmission variables. Other actuators 107 may control the status of various components, such as ignition switch status, audio volume status, etc. Often, but not necessarily, an actuator 107 includes a digital-to-analog converter to convert a digital control signal that can be provided from a digital computer, e.g., via a network, to an analog signal that is usable by an analog control device such as a relay or solenoid, and a sensor 108 includes an analog-to-digital converter to convert an analog sensing signal to a digital signal that can be provided to a digital computer, e.g., via the network.

A vehicle network 112 is a network via which messages can be exchanged between various devices in vehicle 102. The ECUs 104 can be generally programmed to send and/or receive, via vehicle network 112, messages to and/or from other devices in vehicle 102 e.g., any or all of ECUs 104, actuators 107, sensors 108, components, communications module 110, subsystems 106 (HMI, etc.). Additionally, messages can be exchanged among various such other devices in vehicle 102 via the vehicle network 112. Further, as mentioned below, various controllers and/or actuators 107 may receive and provide data to the ECUs 104. In some implementations, vehicle network 112 can be a network in which messages are conveyed via a vehicle 102 communications bus. For example, vehicle network 112 can include an Ethernet network, a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or Wi-Fi communication protocols.

The ECUs 104, computers in other vehicles and infrastructure 118, and/or central computer 120 can communicate via a wide area network 116, for example the Internet or a cellular data network. Further, various computing devices discussed herein may communicate with each other directly, e.g., via direct radio frequency communications according to protocols such as BLUETOOTH or the like. For example, a vehicle 102 can include a communication module 110 to provide communications with devices and/or networks not included as part of the vehicle 102, such as the wide area network 116 and/or other vehicles and infrastructure 118, for example. The communication module 110 can provide various communications, e.g., vehicle to vehicle (V2V), vehicle-to-infrastructure or everything (V2X) or vehicle-to-everything including cellular communications (CV2X) wireless communications cellular, dedicated short range communications (DSRC), etc., to another vehicle 102, to an infrastructure element typically via direct radio frequency communications and/or typically via the wide area network 116, e.g. to the central computer 120. The communication module 110 could include one or more mechanisms by which a vehicle computer such as an ECU 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, CV2X, and the like.

The central computer 120 may also be connected to a database 122 so that vehicle 102 may send or receive data to or from the database 122. This is sometimes referred to as a "cloud" storage.

Figure 2:
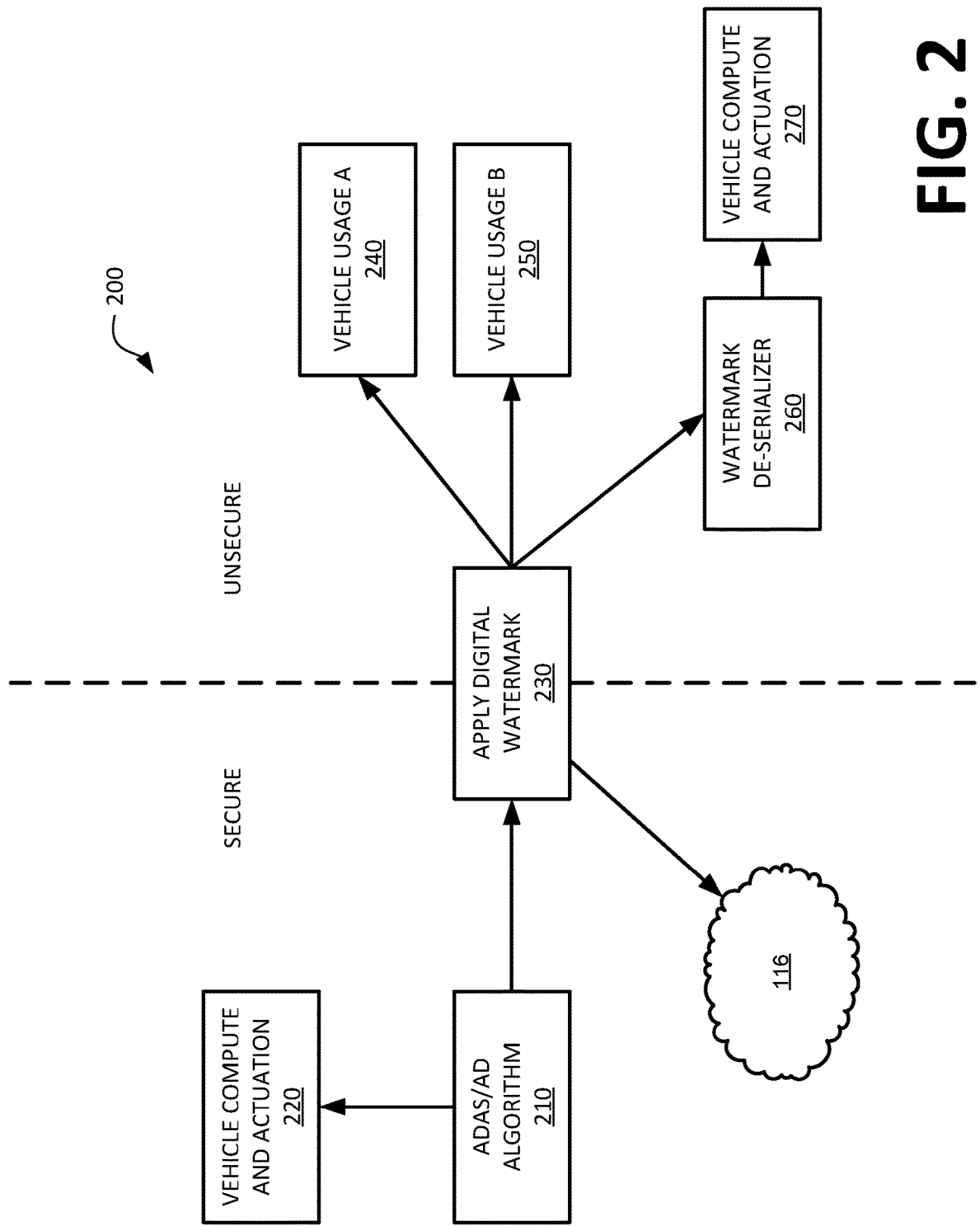
FIG. 2 is a diagram of an implementation to protect vehicle data.

With reference to FIG. 2, diagram 200 shows an example implementation to protect vehicle data wherein the vehicle data designated for protection is from an advanced driver assistance system (ADAS)/autonomous driving (AD) algorithm. Such vehicle data includes, but are not limited to, meta data representation, compression output from perception, perception prediction output, sensor fusion output, localization, planning, path prediction, motion planning, and vehicle feature activation. This implementation is only one example of vehicle data that may be designated for protection, and the present disclosure is not limited to protection of ADAS or AD output. For example, the vehicle may incorporate voice recognition, gesture recognition, or other algorithms used in an HMI function. Other vehicle data that may be designated for protection includes vehicle data having personally-identifiable information embedded therein, diagnostic data collected by a manufacturer of the vehicle, geographic data collected by the vehicle, test data shared with vendors, data produced for government data requests, engineering development and connected vehicle data, sensor data signal processing output, and any other vehicle data that may be considered proprietary.

Diagram 200 includes a secure channel and an unsecure channel. The secure channel may include, for example, a secure ECU in which the ADAS/AD algorithm 210 is being executed to provide, for example, encrypted or otherwise secure data for vehicle compute and actuation 220 via the secure channel. Other vehicle data from the ADAS/AD algorithm 210 may be provided via an unsecure channel. For example, the ADAS/AD algorithm 210 may provide data to a display of an HMI that shows detected lane markings, vehicles, pedestrians, and/or bounding boxes for the detected vehicles and pedestrians as a vehicle usage A 240, and may provide data on the relative detected positions of vehicles, pedestrians, etc. to other vehicles and infrastructure 118 using CV2V or CV2X as a vehicle usage B 250. For example, a vehicle may alert others to hard breaking events of vehicles ahead (e.g. out of line of sight) by providing location, velocity, and acceleration information of vehicle which can be compared to that vehicle's sensor inputs. Since the HMI is subject to observation and the CV2V/CV2X communication is intended for reception by others (and thus may be "intercepted" if it is to be misused), they are subject to observation or interception. Further, since the vehicle data in both vehicle usage A 240 and vehicle usage B 250 may be misused to train a machine learning program and/or reverse engineer a proprietary system/algorithm, the vehicle data in these situations may be designated for protection.

For any particular vehicle usage 240, 250, a suitable digital watermark may be selected, and the digital watermark may be applied at 230 to the vehicle data output to the unsecure channel. In the example of an ADAS/AV algorithm, data output to the CAN bus and/or the HMI with respect to object detection, navigable path, lane line location, etc., may be intercepted on the unencrypted CAN bus or observed in a display output of these features on the HMI or an augmented reality (AR) display.

With respect to HMI observation in vehicle usage A 240, the raw video and the output signals of such detection may, for example, be misused to train a neural network. A suitable watermark in such a situation may involve, for example, modification of decision surfaces or modification of output probability distributions. (As will be recognized, in machine learning the term "decision surface" refers to a diagnostic tool for understanding how a classification algorithm divides up a feature space and that is typically used to label data or plot data for two classes, e.g., yes or no.) In an implementation, the HMI output for usage 240 may be altered so that variations in features captured in a scene may be detectable in the HMI by a trained observer or image analysis techniques. These alterations may include one or more of the timing, location, distributional variation, etc., of the detections such that these alterations may be detectable within the fidelity of the pixel resolution or screen refresh rate, and thus be suitably robust to detection if used for neural network training. "Suitably robust" in this context means that, if another entity uses data altered with a digital watermark as described herein to train a neural network, the watermark, i.e., alteration in the data, will be detectable in output from the system trained with the misused data. In an example, bounding boxes for detected objects may include offsets to change the distribution of bounding boxes in the video perception. If data representing the detection data of the bounding boxes is misused, it may later be detected by studying the distribution of bounding boxes resulting from an entity that has misused the data after reviewing a series of input and output images.

In another example implementation, alteration of a boundary of a classification region may be used to watermark image data. For example, a model may be trained and result in a given decision surface. It may be altered, based on training examples or model changes, to result in a specific decision output (e.g., estimating vehicle orientation in an image) along a given dimensional space of the input to result in a decision surface recognizable as a watermark. As an example, the estimate vehicle orientation in an image using an unaltered algorithm, may produce a given detection with some linear bias compare to a ground truth over average image brightness and contrast in the image pixels. After introduction of watermarking, the error in the algorithm may be described as a polynomial error as a function of brightness and contrast that would be detectable based on the specifics of the mode of attacker access, e.g., HMI, CAN, V2X, etc. In further example implementation, a black box technique may be used to watermark the vehicle data to produce watermarked output that can operate without knowledge of or ability to access a competitor's reverse engineering of an algorithm. For example, a pedestrian detection and localization algorithm may be developed that, if a competitor were to attempt to reverse engineer and re-implement, the watermark feature in the algorithm would remain in the new algorithm irrespective of model fine tuning, parameter tuning, model inversion attack, surrogate model attack, etc. In this black box example, it is assumed that the attacker does not have access to the original model, nor can an attacker's model be reviewed directly afterwards. Further, the attacker can only observe input into the model and the model output. Nevertheless, this black box model is more than sufficient to train a neural network model regardless of the specifics of the actual algorithm the attack is copying. It must also be observed that in the case of a black box model, a white box attack may occur where the attacker can inspect the model parameters directly (e.g., ECU decrypted and the neural network structure, weights, and biases can be inspected and copied directly). A number of methods for black box watermarking of algorithms are known in the art wherein behavior may be adjusted to obtain sufficient detectability in the output to allow the attacker to copy and thus incorporate into their algorithm.

In another implementation suitable for a vehicle compute and actuation 270 that involves an unsecure channel, an example of lane centering will be discussed. The lane centering may be based on detecting vehicle position data with respect to a lane line and providing steering command data from an ADAS/AD algorithm 210 to a steering ECU. However, the steering command data may be intercepted on the unencrypted CAN bus in the unsecure channel. In accordance with the present disclosure, a watermark may be inserted or applied at 230 to the steering command data to add a slight offset, variation, distribution, or another alteration in the steering command data which would watermark the temporal series as watermarked output. The steering ECU may de-serialize the watermarked output with a watermark de-serializer 260 to remove or ignore the slight differences in implementing a steering command. However, misappropriation and/or misuse of the intercepted steering command data would later be detectable based upon the inserted watermark.

For the vehicle data that is watermarked at 230, a watermark identifier may be saved to the cloud through wide area network 116 to communicate and store the watermark identifier to a location external from the vehicle 102. The watermark identifier may, for example, comprise a secret key K and/or vehicle VIN as a watermark message to be used for later detection of the watermark if the watermarked output is misused by others.

With respect to interception of vehicle data on the unencrypted CAN bus or V2V communication as in usage 250, a further implementation may encode a watermark into event stream data by using the last significant floating point digit. This data may be ignored by an ECU or connected vehicle, but the encoding may survive transformation after misuse and thus be detected. The resolution of the vehicle usage 240, 250 (HMI, V2V, etc.) and the amount of transformation in the misused vehicle data should be considered in selection of a suitable watermark so that it may be robust enough to survive and be detectable when the watermarked vehicle data is misused.

Figure 3:
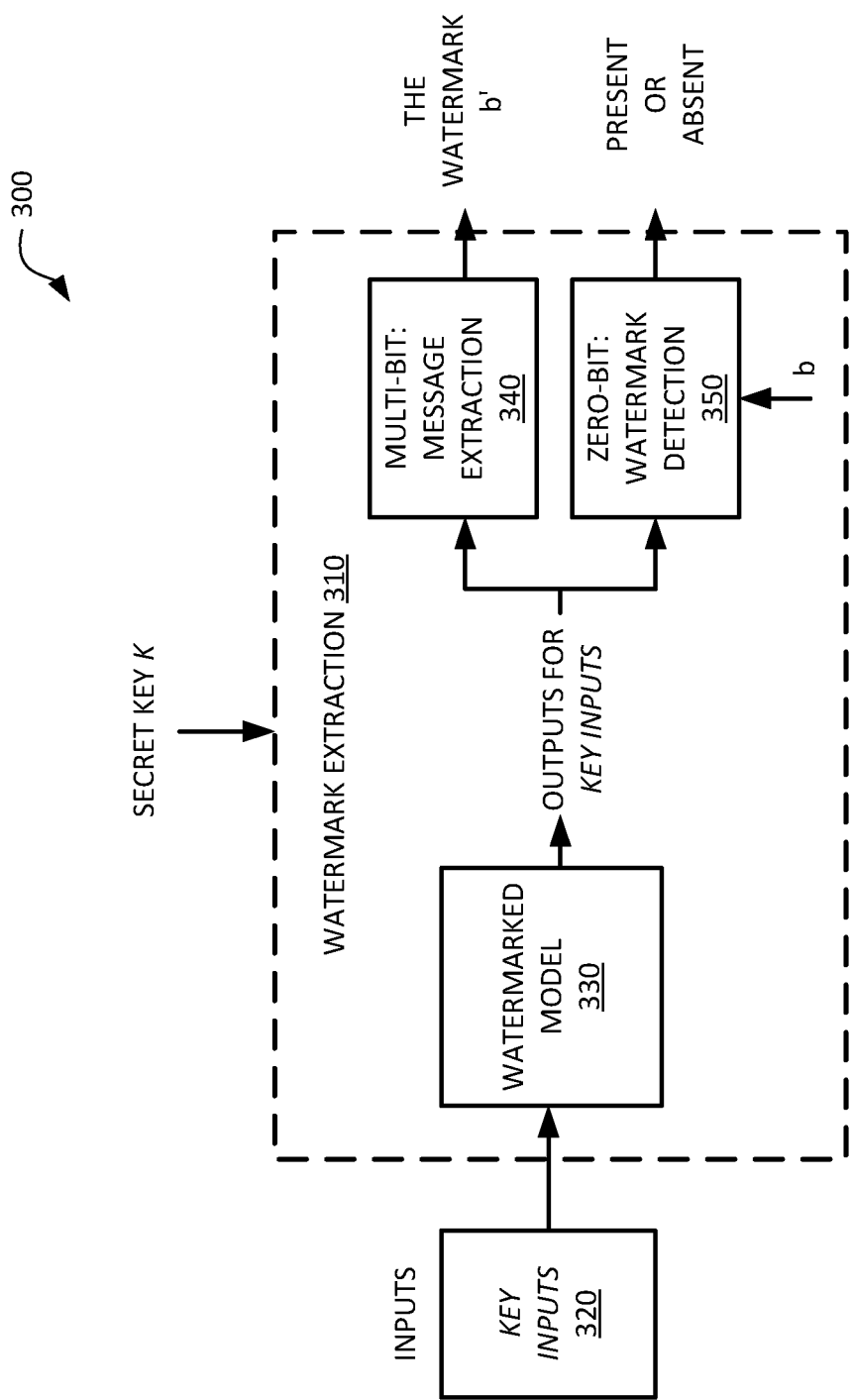
FIG. 3 is a flow diagram of watermark detection.

With reference to FIG. 3, a flow diagram 300 of watermark detection is illustrated. In accordance with the present disclosure, either multi-bit or zero-bit watermarking may be employed during application of a watermark at 230, and the watermark information such as a secret key K and a watermark message b may be sent by wide area network 116 to the cloud for storage, such as in database 122.

If intercepted or observed vehicle data has been misused, such as by being used for training a neural network model for a competitor's driving algorithm, a watermarked model 330 resulting therefrom may be detected by watermark extraction 310 using secret key K. When key inputs 320 are input into watermarked model 330, the outputs for the key inputs may be used to extract or detect the watermark. In the case of a multi-bit watermark, message extraction 340 involves input of key inputs 320, outputs for key inputs containing the watermark, and the secret key K to obtain the message or watermark b'. In the case of a zero-bit watermark, watermark detection 350 involves input of key inputs 320, outputs for key inputs containing the watermark, the secret key K, and the watermark b to determine whether the watermark b is present or absent in the outputs for the key inputs.

Figure 4:
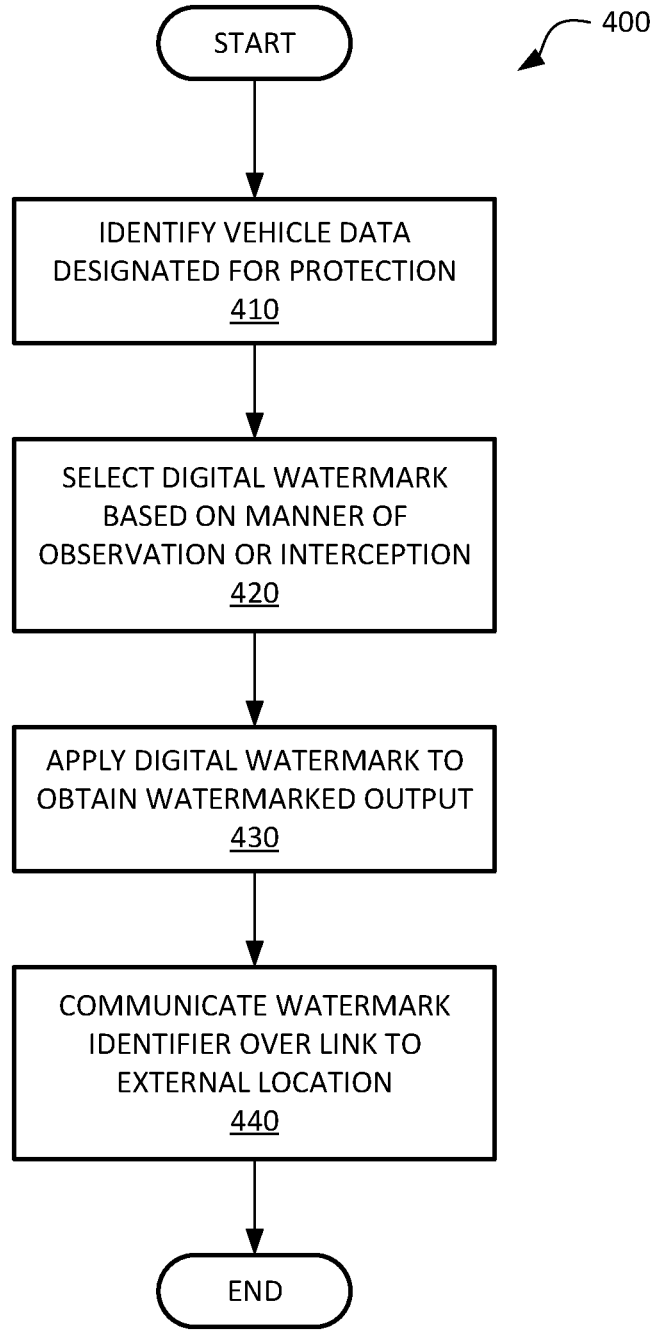
FIG. 4 is a flow diagram of a process for vehicle data protection.

With reference to FIG. 4, a process 400 for vehicle data protection is illustrated. In a first block 410, vehicle data that is designated for protection is identified. This designation is done in a secure channel, such as within an encrypted or secure ECU. At block 420, a digital watermark is selected for the vehicle data based upon the manner in which the designated vehicle data is subject to observation or interception. For example, V2V data and HMI display data have differing resolutions and usage requirements, and thus may have a digital watermark selected based upon these differences, as discussed above with respect to FIG. 2.

At block 430, a digital watermark is applied to the designated vehicle data to obtain watermarked output. The digital watermark may, for example, be applied within the encrypted or secure ECU for subsequent output over an unsecure channel, such as an unencrypted CAN bus or V2V transmission. At block 440, a watermark identifier is communicated over a communication link to an external location. A watermark identifier may include a secret key K and a watermark message b. The watermark identifier may be stored, for example, in a database 122. In an implementation, the watermark message b may include a VIN of the vehicle 102 so that any misuse of the vehicle data may be traced to a particular vehicle.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computing device for a vehicle comprising a processor and a memory, the memory storing instructions executable by the processor, the instructions including instructions to:
    identify vehicle data to be included in output from the processor that is designated for protection;
    select a digital watermark based on a usage manner in which the output is subject to at least one of observation or interception;
    apply the digital watermark to the vehicle data to obtain watermarked output for output from the processor; and
    communicate a watermark identifier over a communication link of the vehicle to a location external from the vehicle.

2. The computing device of claim 1, wherein the vehicle data is output from an electronic control unit (ECU) in the vehicle.

3. The computing device of claim 1, wherein the vehicle data is output from at least one of an automated driver assistance system (ADAS) algorithm or an autonomous vehicle (AV) algorithm.

4. The computing device of claim 1, wherein the vehicle data is selected from at least one of meta data representation, compression output from perception, perception prediction output, sensor fusion output, localization data, planning data, path prediction data, motion planning data, or vehicle safety feature activation data.

5. The computing device of claim 1, wherein the vehicle data is at least one of data for actuation of a vehicle system or data for display on a human-machine interface (HMI).

6. The computing device of claim 1, wherein the digital watermark is applied to the vehicle data in a secure channel for output as the watermarked output over an unsecure channel.

7. The computing device of claim 6, wherein the unsecure channel is a vehicle network selected from an Ethernet network and a controller area network (CAN) bus.

8. The computing device of claim 6, wherein the unsecure channel includes a human-machine interface (HMI).

9. The computing device of claim 6, wherein the unsecure channel includes a cellular vehicle to vehicle (CV2V) transmission and/or a cellular vehicle to infrastructure (CV2X) transmission.

10. A method for protecting vehicle data from a vehicle, comprising:
    identifying the vehicle data to be included in output from a processor that is designated for protection;
    selecting a digital watermark based on a usage manner in which the output is subject to at least one of observation or interception;
    applying the digital watermark to the vehicle data to obtain watermarked output for output from the processor; and
    communicating a watermark identifier over a communication link of the vehicle to a location external from the vehicle.

11. The method of claim 10, wherein the vehicle data is output from an electronic control unit (ECU) in the vehicle.

12. The method of claim 10, wherein the vehicle data is output from at least one of an automated driver assistance system (ADAS) algorithm or an autonomous vehicle (AV) algorithm.

13. The method of claim 10, wherein the vehicle data is selected from at least one of meta data representation, compression output from perception, perception prediction output, sensor fusion output, localization data, planning data, path prediction data, motion planning data, or vehicle safety feature activation data.

14. The method of claim 10, wherein the vehicle data is at least one of data for actuation of a vehicle system or data for display on a human-machine interface (HMI).

15. The method of claim 10, wherein the digital watermark is applied to the vehicle data in a secure channel for output as the watermarked output over an unsecure channel.

16. The method of claim 15, wherein the unsecure channel is a vehicle network selected from an Ethernet network and a controller area network (CAN) bus.

17. The method of claim 15, wherein the unsecure channel includes a human-machine interface (HMI).

18. The method of claim 15, wherein the unsecure channel includes a cellular vehicle to vehicle (CV2V) transmission and/or a cellular vehicle to infrastructure (CV2X) transmission.

19. The method of claim 15, further including de-serializing the watermarked output upon being received in a second secure channel for vehicle computer and actuation based upon the vehicle data.

20. The method of claim 10, further including detecting the digital watermark in data outside of the vehicle based upon the watermark identifier to determine misuse of the vehicle data.

* * * * *